(No Model.)

J. H. WHITAKER.
HARNESS.

No. 461,210.  Patented Oct. 13, 1891.

Witnesses:
W. W. Humphrey
C. R. McCandless

Inventor:
John H. Whitaker
per Wm K. White
Attorney

United States Patent Office.

JOHN H. WHITAKER, OF DAVENPORT, IOWA.

HARNESS.

SPECIFICATION forming part of Letters Patent No. 461,210, dated October 13, 1891.

Application filed January 26, 1891. Serial No. 379,213. (No model.)

*To all whom it may concern:*

Be it known that I, JOHN H. WHITAKER, a citizen of the United States, residing at Davenport, in the county of Scott and State of Iowa, have invented a new and useful Harness, of which the following is a specification.

The object of my invention is to provide a harness attachment to cause horses to spread apart their hind limbs so as to step with the hind feet outside the line of travel of the fore feet, and thus avoid interfering or striking the hoofs; and another object is to teach or induce the animal to lengthen the strides of its hind limbs. I accomplish these objects by the mechanism illustrated in the accompanying drawings, in which—

Figure 1:
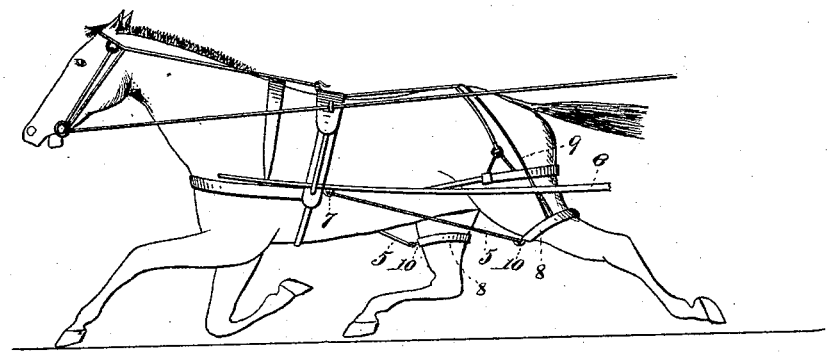
Figure 2:
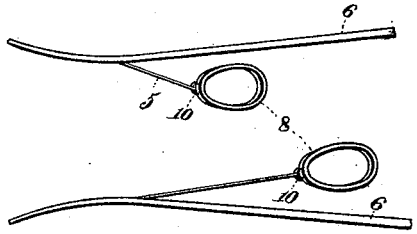
Figure 3:
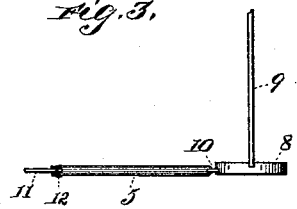

Figure 1 is a view of my harness attachment as it appears upon the animal. Fig. 2 is a plan view of the device, showing the position of the hind limbs of the animal when trotting, such limbs being indicated by the dotted lines; and Fig. 3 is a side view of my device, together with a shackle and hip-strap.

Similar figures refer to similar parts throughout the several views.

My invention consists in using a strap possessing elasticity, in securing one end to the hind limb of an animal near its body, and passing the opposite end forward and securing the same to the shaft of the vehicle or some part of the harness—as, for instance, the collar. I use straps in this manner on both hind limbs; but it may be desirable in some instances to use only one strap—as, for instance, where the step or stride of one hind limb is less than the other or where the animal steps with one hind foot inside the line of travel of the opposite fore foot and with the other hind foot outside of the line of travel of the opposite front foot. Hence I do not wish to limit myself to the use of two straps, as one only may be used to advantage under these circumstances. I arrange these straps so that when the animal is standing and at rest the tension of the strap will be quite strong, tending to draw his hind limbs forward. The method of attaching the strap to the hind limb and to the shaft or harness may be in any desired and suitable manner. I prefer, however, to use shackles for the hind limbs, securing the straps to such shackles.

In the drawings, 5 represents a strap or cord possessing elasticity, and may be elastic webbing. 6 represents a section of a vehicle-shaft. 7 is a staple on the under side of the shaft. 8 are limb-shackles, and 9 a hip-strap connected at one end with the shackle and the opposite end with the crupper-strap or other suitable part of the harness for the purpose of retaining the shackle in position on the animal's limb.

It will be seen that the strap 5 may be attached directly to the vehicle-shaft or to any projection or arm secured to such shaft, and such arm may be extended downward or outward, as may be desired, or such strap may be attached to some suitable part of the harness, as the collar, the object being to secure such end of the strap to a body forward of the hind limbs of the animal, and which body does not oscillate with the movements of the hind limbs of the animal or in unison therewith. I prefer to use a shackle having attached to it a loop 10, to which I secure an end of strap 5. Such attachment permits such end of the strap to move or slide on the loop, and thus accommodate itself to the movements of the animal. I also prefer to attach the opposite end of such strap to a short leather strap 11, provided with a buckle 12, for the purpose of securing strap 5 to the staple 7 in the shaft of the vehicle.

It will also be understood that the strap 5 may be composed of sections—as, for instance, the middle section may be composed of elastic webbing having attached at either end another section composed of leather—and these sections may be separable and provided with buckles or other means for connecting them, and also for shortening or lengthening the strap.

My invention is not limited to any particular form of strap, as a cord may be used, the essential feature being that it possess elasticity. Nor do I limit myself to any particular form of attaching such strap to the hind limb of the animal, or to the shaft of the vehicle, or to a part of the harness, the essential feature being that the strap shall be so attached as to exert a strain or pull upon the hind limb of the animal in a forward direction or a forward and outward direction.

I am aware it is old to incorporate elastic material in harness-straps, and I therefore do not claim such combination, broadly.

In a former invention for the same purpose, for which I obtained Letters Patent No. 377,727, dated February 7, 1888, I have shown a connection between the shackle-strap on the hind limb of the animal and the shaft of the vehicle, such connection consisting of an elastic cord attached at one end to the shackle-strap and at the other end to a sliding sleeve arranged to move on a rod secured to the shaft, so that the outer connection of the elastic cord would move or slide to and fro in unison with the movements of the animal's hind limbs. My present invention is an improvement upon that device in this, that the end of the elastic cord not attached to the shackle-strap on the hind limb of the animal is carried forward and attached rigidly to the shaft, so that it will not slide or move upon the same to and fro in unison with the movement of such hind limb of the animal, or is rigidly attached to a forward portion of the harness for a like purpose, and I therefore avoid the use of such sliding sleeve or its equivalent by so using such elastic strap, its elasticity being such that it will increase and decrease in length, or, in other words, will accommodate itself to the movements of the animal's hind limb by being substantially at all times stretched and not slack.

I am aware that since the granting of said Letters Patent to myself Letters Patent No. 438,360, dated October 14, 1890, and Letters Patent No. 444,570, dated January 13, 1891, have been granted; that in the first, for the purpose of spreading the animal's hind limbs, it is proposed to support two elastic arms from the back of the animal extending down to a point opposite of the hip-joint of the hind limb, at which point extensions are hinged to each arm. The opposite end of each extension is attached to a shackle-strap upon each hind limb of the animal. The elastic arms are designed to exert an outward pull upon the hind limbs, while the hinged connection of the extensions to the arms and the elasticity of such arms are intended to permit the ends of such arms to move to and fro in unison with the movement of the animal's hind limbs. In the latter patent, which is an improvement on the former, the hinged extensions are omitted, and the elastic arms, instead of being supported rigidly from the animal's back, are to be journaled in a support thereon, so the ends of such arms may swing to and fro in their journaled bearings, the lower ends each being secured to a shackle-strap on each hind limb of the animal, thus permitting such lower ends to swing or move to and fro in unison with the movements of the animal's hind limbs.

I do not claim in this invention the patentable features which are legally shown or claimed in the two patents last cited, nor do I broadly claim the features which are shown in said Letters Patent heretofore issued to myself.

What I claim as new, and desire to secure by Letters Patent, is—

The combination of a harness and a shackle to surround the limb of the animal, an elastic strap attached to the shackle and adapted to be attached to the harness or vehicle at a point some distance in front of the shackle, and a suitable support for the latter, substantially as described.

JOHN H. WHITAKER.

Witnesses:
 GEO. E. GOULD,
 L. G. SUSEMIHL.